Sept. 11, 1962  T. R. SMITH  3,053,030
GAS FILTERING METHOD AND APPARATUS
Filed Dec. 22, 1958  4 Sheets-Sheet 1

INVENTOR.
TOM R. SMITH
BY
Ralph B. Brick
ATTORNEY

Sept. 11, 1962 T. R. SMITH 3,053,030
GAS FILTERING METHOD AND APPARATUS
Filed Dec. 22, 1958 4 Sheets-Sheet 2
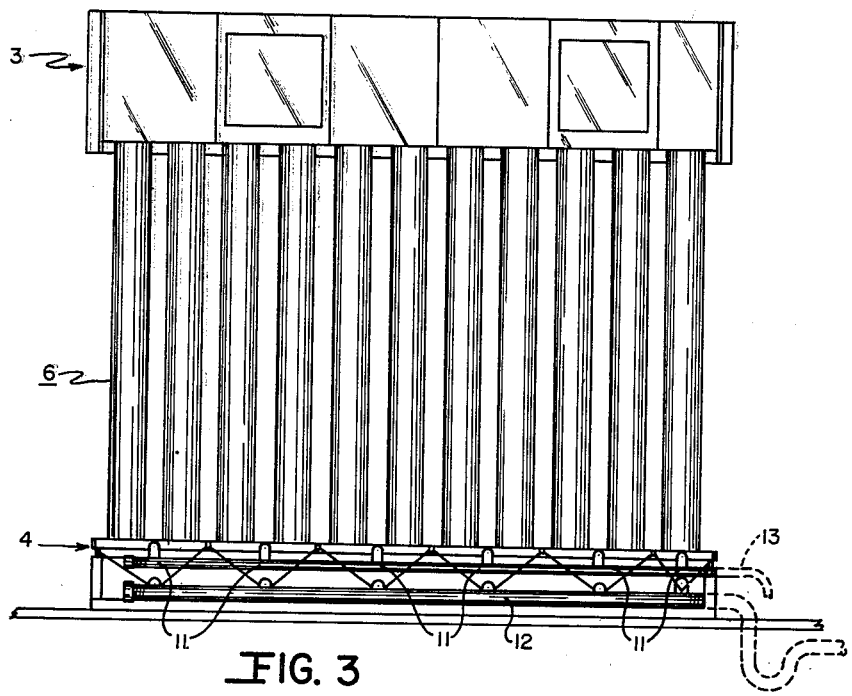
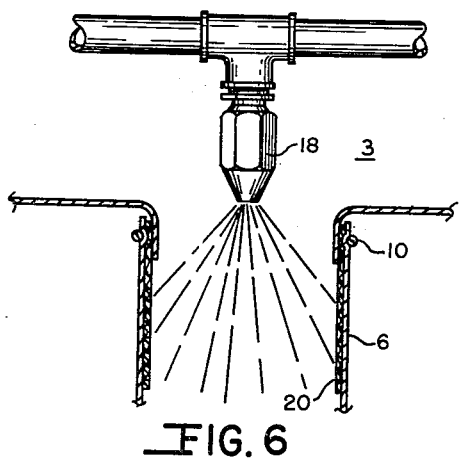
INVENTOR.
TOM R. SMITH
BY
*Ralph B. Brick*
ATTORNEY

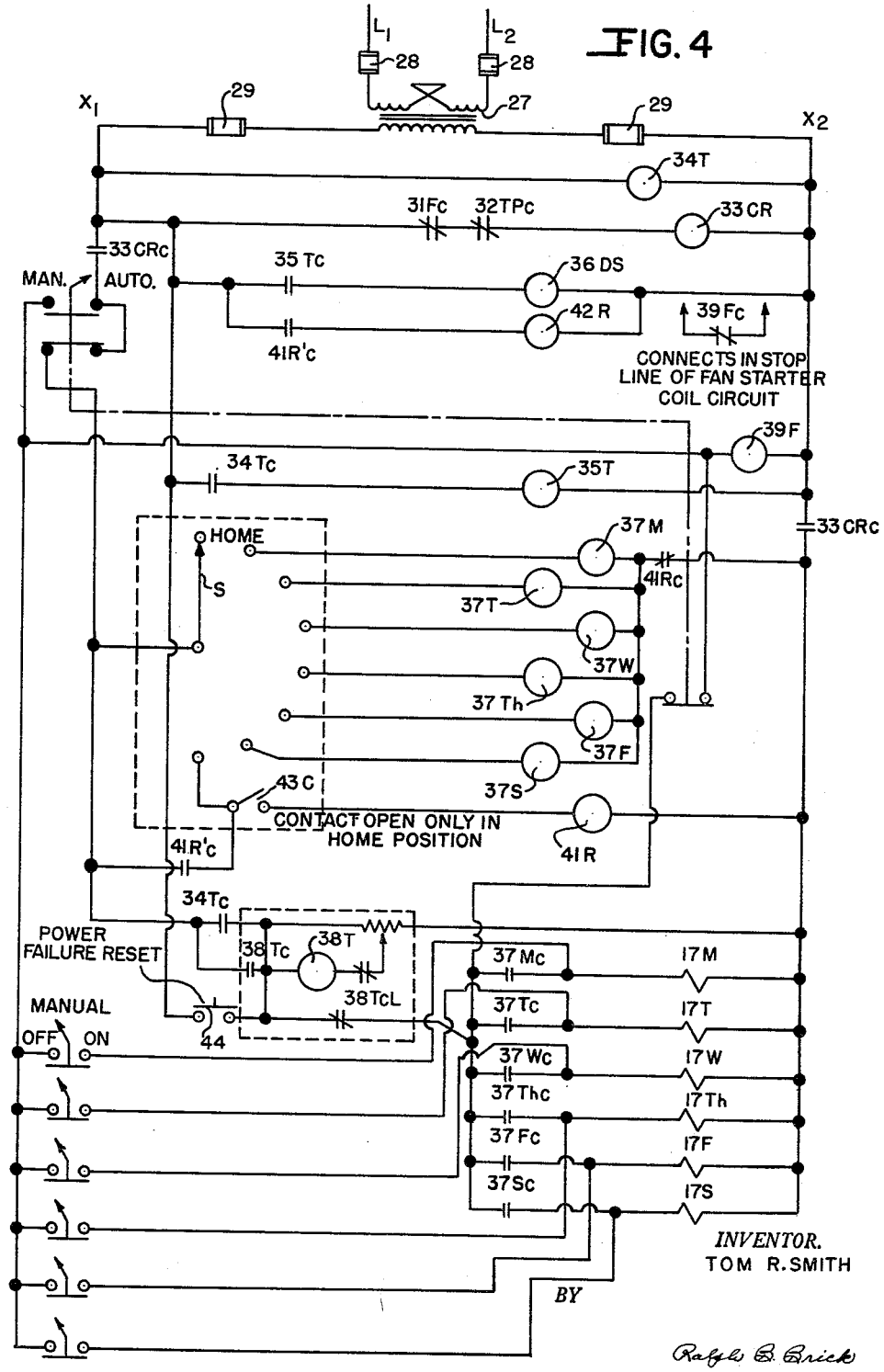

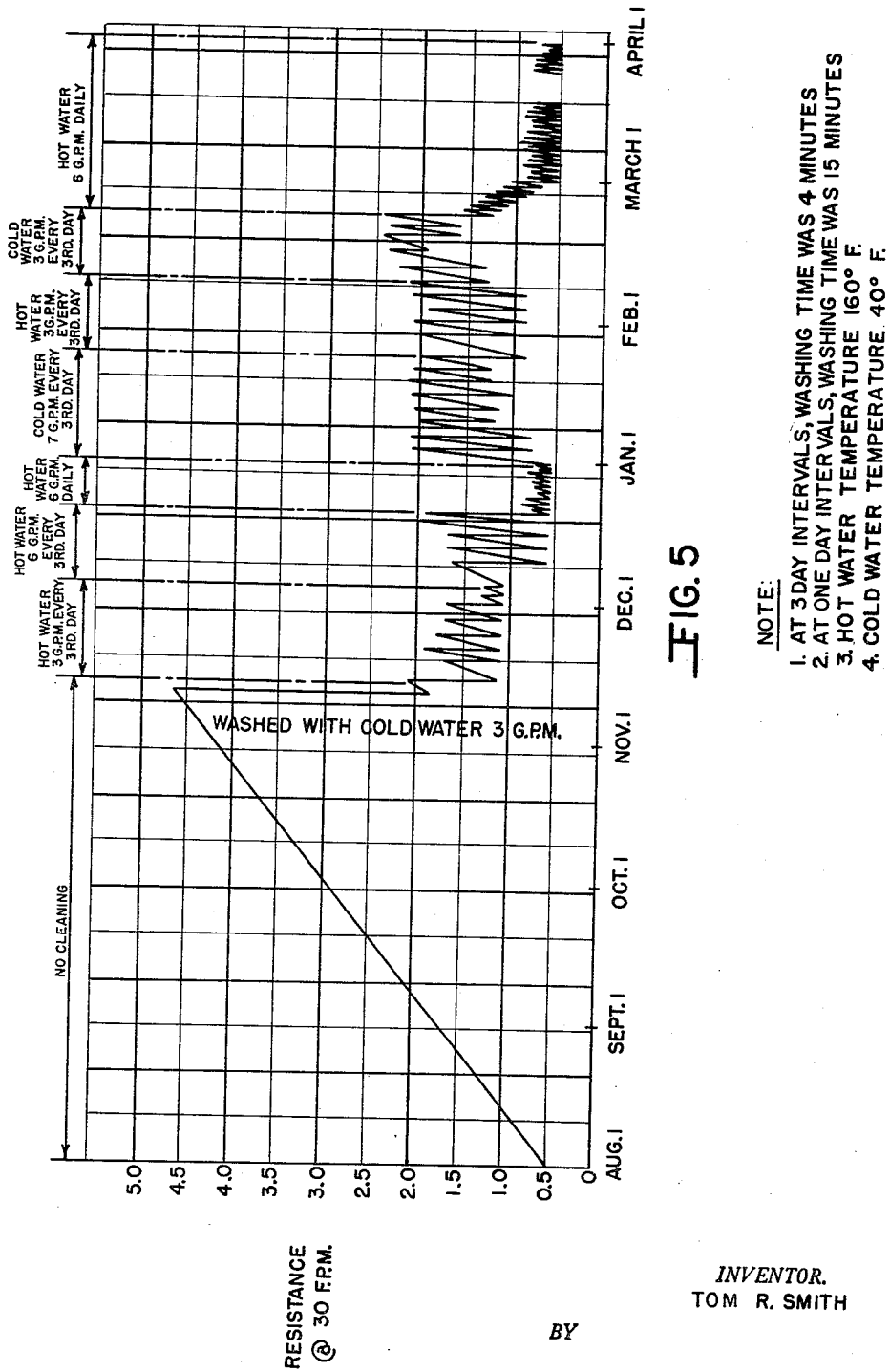

United States Patent Office 3,053,030
Patented Sept. 11, 1962

3,053,030
GAS FILTERING METHOD AND APPARATUS
Tom R. Smith, Louisville, Ky., assignor to American Air Filter Company, Inc., Louisville, Ky., a corporation of Delaware.
Filed Dec. 22, 1958, Ser. No. 782,249
1 Claim. (Cl. 55—242)

This invention relates to a method and apparatus for filtering dust particles from dust laden gases and more particularly to an improved method and apparatus for removing dust particles from filtering material through which the dust laden gases are passed.

It has been common practice in the gas cleaning art for many years to filter gases with high dust load concentrations through gas pervious filter materials in the form of fabric filter tubes, the dust particles being allowed to collect on the surface of the tubes until such time that the resistance of the tubes becomes so high that removal of the particles from the tubes is necessary to carry out effective gas cleaning operations. The manner of removal of dust particles from the filter tubes has presented a constant source of difficulty in the art.

In early attempts to remove dust particles deposited on the fabric tubes where high dust load concentrations with large dust particle sizes (5 microns in diameter and above) were involved, fluid streams under considerable pressure were directed against the tube surfaces. The fluid streams, preferably air, were used to vibrate the tubes and shake the collected particles loose from the surface. This method of dust removal proved unsuccessful as it subsequently was abandoned in favor of mechanical vibrating apparatus and mechanical blowing apparatus which embodied a reverse jet stream of air. These latter forms of mechanical apparatus for dust particle removal have been employed effectively to dislodge the large dust particles (5 microns in diameter and above) from the surface of the tubes so that such dust particles settle by gravity in collecting means positioned below the filter tubes. However, not only has such mechanical apparatus proven to be heavy, complex, and expensive in installation and maintenance cost but, in addition, such apparatus has been unable to remove effectively the smaller dust particles (below 5 microns in diameter). These smaller dust particles tend to migrate from one portion of the fabric tube to another when subjected to the action of the mechanical apparatus and, when and if they eventually are dislodged, they do not settle out readily by gravity because of their mass but tend to recollect on the tube surface.

The present invention, recognizing the limitations of past gas filtering methods and apparatus, provides a gas filtering method and apparatus which avoids these limitations to permit efficient filtering of dirty gases having dust particles of various sizes, including those particles below five (5) microns in diameter size as well as those above five (5) microns in diameter size. The method and apparatus of the present invention accomplishes this result in a straightforward, economical and efficient manner with a minimum of parts and maintenance. Furthermore, because of the efficient and versatile scope of operation of the present invention in the removal of dust particles of varying sizes, it is possible to employ this invention not only in industrial situations where dirty gases of high dust concentration are to be filtered but also in those situations where it is desirable to filter atmospheric air in which the dust concentrations is comparatively low and the particles are small. It is to be understood that other features of the present invention will become obvious to one skilled in the art upon reading the disclosure set forth hereinafter.

More particularly, the present invention provides a method of filtering dust particles of varying sizes, including dust particles below five microns in diameter, from dust laden gases comprising the steps of passing the dust laden gases through a rot resistant, smooth surfaced gas-permeable filter zone for a period of time sufficient to permit the deposit of a layer of dust particles of substantial thickness in the filter zone, interrupting the gas passage through the filter zone, passing a hot liquid solvent through the filter zone after the gas passage therethrough is interrupted to clean the zone of dust particles, and drying the filter zone for a predetermined period of time before passing additional dust laden gases therethrough. In addition, the present invention provides a dust collector apparatus comprising rot resistant, gas pervious filter tube means, "on-off" gas control means to control the flow of dust particle laden gases through the filter tube means, hot liquid supply means, liquid spray means connected to the hot liquid supply means to direct a sheet of hot liquid against the filter tube means to clean the filter tube means of dust particles of varying sizes, and "on-off" liquid control means cooperating with the hot liquid spray means and operably related to the "on-off" gas control means to control the flow of hot liquid from the spray means so that the filter tube means is sprayed when the gas control means is in "off" position.

It is to be understood that various changes can be made by one skilled in the art in the several steps of the method disclosed herein and in the arrangement, form and construction of the apparatus disclosed herein without departing from the scope or spirit of the present invention.

Referring to the drawings which disclose one advantageous embodiment of the present invention:

FIGURE 3 is a front elevation of the schematically disclosed filter tube unit of FIGURES 1 and 2;

FIGURE 4 is a schematic diagram disclosing electrical circuitry for the operations of the liquid spray system of the filtering unit disclosed in FIGURES 1-3;

FIGURE 5 is a graph of an experimental test conducted for an eight (8) month period on a unit similar to that disclosed in FIGURES 1-4, comparing the differences in filter tube resistance when a hot liquid solvent spray is used and a cold liquid solvent spray is used;

FIGURE 6 is a detailed view of a nozzle arrangement for spraying a sheet of hot liquid solvent onto the inner wall of a filter tube.

Figures 1, 2:
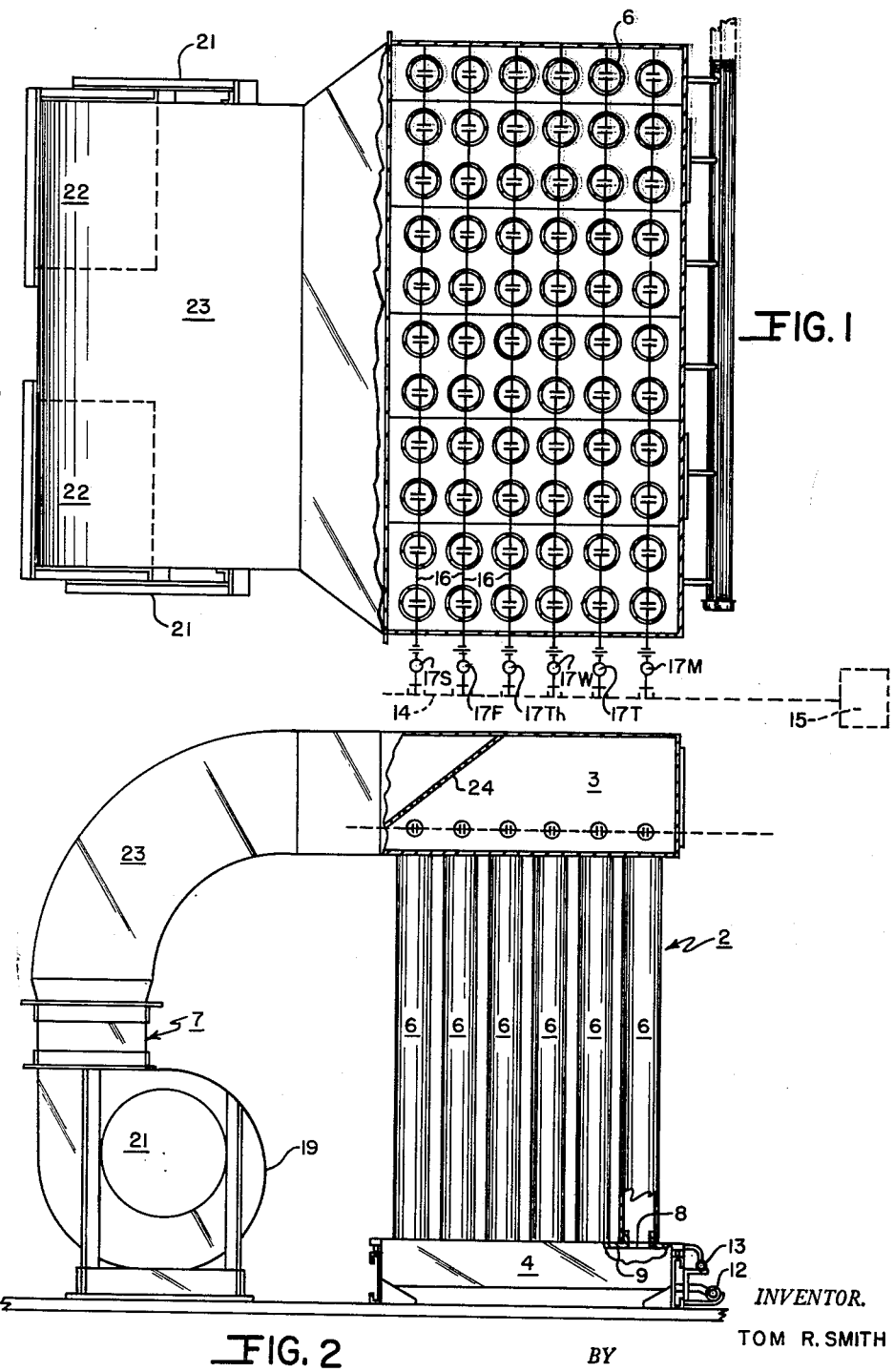
FIGURE 1 is a schematic plan view of a filter tube unit with the roof of the filter tube support header being removed to disclose schematically the liquid spray network.
FIGURE 2 is a partially broken side elevation of the schematically disclosed filter tube unit of FIGURE 1 with a side wall of the filter tube support header being removed to disclose schematically the liquid spray network and the gas distribution baffle.

Referring to FIGURES 1-3 of the drawings, filter tube unit 2 is disclosed broadly as including at the top portion a filter tube support header 3, a trough arrangement 4 at the base portion, a plurality of vertically extending filter tubes 6 connected intermediate support header 3 and trough arrangement 4, and a supply duct and fan arrangement 7 connected to support header 3. In the embodiment shown, six (6) equally spaced rows of filter tubes are provided with each row of tubes including eleven (11) equally spaced tubes so that each filter unit 2 includes sixty-six (66) filter tubes. In this connection, it is to be understood that various numbers and geometrical arrangements of tubes can be used as the requirements of the particular situation demand.

In accordance with one of the principal features of the present invention, it has been found desirable to fabricate the filter tubes 6 from a gas pervious, smooth surfaced fabric which is resistant to rot. In this connection, certain synthetic fabrics such as Orlon, capable of resisting temperatures as high as 200° F. and capable of resisting bacteriological decay or rot have been found to be very satisfactory for use in the present invention. Such fabrics not only provide an effective, long lasting, filter media to filter out dust particles from gases passed therethrough but, in addition, it has been found that the filtered dust particles, including the small ones of less than five microns in diameter size, which have collected on the surface of such fabrics are released readily therefrom when a hot liquid solvent is passed in sheet-like form over the fabrics, as will be described hereinafter. This ability of gas pervious smooth surfaced, rot resistant fabrics to release even the smaller dust particles when treated with a sheet of liquid solvent and thus lower the filter tube resistance for further filtering operations comprises a decided and unexpected improvement in performance over the filter tubes used in the past. With the filter tubes used in the past, the larger dust particles (those over five (5) microns in diameter) were released from the surface of a filter tube only after intense vibration or reverse high pressure blowing and the smaller dust particles (those less than five (5) microns in diameter) adhered to the filter tube even after being subjected to such measures. In this connection and by way of explanation, the present invention recognizes that past fabrics used for filter tubes, such as wool or cotton, have many little "horns" and "scabs" on their surfaces. These "horns" and "scabs," which are quickly discernible upon viewing a microphotograph have served to cling relentlessly to the dust particles, particularly the smaller particles, during cleaning operations. Certain synthetic fabrics, on the other hand, are not encumbered with such a surface. In fact, in a standard roughness test wherein measurement is made of irregularities from peak to valley and the average arithmetical average deviation from the mean surface serves as a rating basis (G.E. Roughness Bulletin GEJ-1231B), it can be noted that Orlon fibers have a roughness grade of 8, or one-half that of wool which has a roughness grade of 16. Moreover, in addition to that feature wherein the rot resistant, smooth surfaced fabric, such as Orlon, responds in an efficient manner to cleaning operations, it also is to be noted such fabric provides the further feature of drying quickly to permit ready renewal of gas cleaning operations under low resistance conditions.

Referring particularly to the broken section of FIGURE 2 of the drawings, it can be seen that the lower portion of each tube 6 is connected to a nippled opening 8 in trough cover plate 9. A suitable annular clamp (known in the art and not shown in detail) is provided to hold each tube in proper engagement with its nipple and to permit quick attachment and removal of the tube. It will be obvious to one skilled in the art that a similar nipple-annular spring clamp arrangement can be provided for the connection of the upper portion of each filter tube to the bottom of the filter tube support header 3 (FIGURE 6).

Positioned below trough cover plate 9 in communication with nippled openings 8 are a plurality of truncated troughs 11. In the embodiment of the apparatus disclosed six such troughs are provided, extending in side-by-side relationship from the front to the rear of the filter unit 2 with five of the troughs each being sized to accommodate the fluid flow from twelve of the filter tubes and one trough being sized to accommodate the fluid flow from the remaining six filter tubes. Although not apparent from the drawings, it is to be understood that each of the troughs 11 slopes slightly from front to rear to permit gravity flow of the fluid collected from the inner portion of the filter tubes 6 to a header pipe 12 and thence to a drain. It further is to be understood that in similar fashion, the trough cover plate 9 also slopes slightly from front to rear to permit gravity flow of the fluid collected from the outer walls of the filter tube 6 to a header pipe 13 and thence to drain.

Referring particularly to FIGURE 1 of the drawings, a liquid spray network is disclosed schematically by broken lines as being disposed in the filter tube support header 3 in a horizontal plane, the spray network extending a short distance above the upper openings of the filter tube 6. The liquid spray network includes a main header pipe 14 running along the side of filter unit 2 and connected to a hot liquid supply source 15. Six branch pipes 16 extend from main header pipe 14 over a row of filter tubes 6 in such a manner that an extension of the longitudinal axes of the filter tubes 6 would intersect the longitudinal axis of the branch pipe 16 thereabove. It is to be noted that adjacent the take-off point of each branch pipe 16 from main header pipe 14, there is a solenoid "on-off" valve, each solenoid valve being indicated respectively by one of the reference numerals 17M, 17T, 17W, 17Th, 17F and 17S. As will be described hereinafter, electrical circuitry is provided to operate these solenoid valves sequentially so that the rows of filter tubes 6 in a filter unit 2, can be cleaned one at a time.

To insure an effective spraying of the inner walls of each filter, spaced nozzles 18 are provided along each branch pipe, one nozzle being provided for each filter tube 6 (FIGURE 6). Each nozzle 18 is positioned a short distance above the tube opening with its discharge axis in alignment with the vertical axis of the tube which it serves. It has been found that the most efficient cleaning effects from each nozzle 18 has been obtained when the included spray angle of the nozzle is 70° or less. This insures that the velocity of the liquid emanating from the nozzle is not completely dissipated against the tube wall but rather is utilized in the entrainment of dust particles on the surface of the tube to provide more effective filter tube cleaning. To prevent wear at the top of the tube wall where the liquid impinges, a sleeve insert 20 is provided to extend over and below the area of initial liquid impingement. Advantageously, the sleeve can be made from a polyethylene material which is both durable and resistant to micro-organisms. With the sleeve insert, it is possible to avoid frequent tube changes which might otherwise be required.

To introduce dirty gases to be cleaned through the filter tube support header 3 and into the filter tubes 6 so as to be passed radially outward therefrom, the supply duct and fan arrangement 7 includes a fan housing 19 having a gas intake 21 along each side thereof. A pair of fans 22 (shown schematically by dotted lines in FIGURE 1) are positioned within the fan housing 19 adjacent the inlets 21. The fans serve to induce the dirty gases to be treated into housing 19 from where they then pass through a 90° elbow duct 23 connected thereto into supply header 3. To insure proper gas distribution and even flow into the filter tubes, an inclined, perforated baffle plate 24 is provided in header 3 transverse the direction of gas flow from the duct and fan arrangement.

Although one filter tube unit 2 as above described can be employed by itself in a single gas cleaning installation with the fan capacities and number of filter tubes being selected to meet the demands of the environment in which the unit is installed, it is to be understood that several units in a single installation can also be provided if so desired.

In operating a filter unit 2, it has been found desirable to clean the rows of the unit one at a time in sequence. Not only does this minimize the quantity of liquid solvent required at any one time during cleaning operations but, in addition, it serves to maintain a substantially uniform resistance over the entire operating period and thus a uniform gas pressure in connection with the installation which the filter unit serves during such period. In this connection, the present invention recognizes that the simultaneous cleaning of all tubes creates a sudden resistance drop in the system, the resistance building up again after the cleaning of the tubes and upon resumption of gas cleaning operations.

To accomplish the sequential cleaning of filter tube rows automatically in accordance with the present invention, an electrical circuit arrangement such as that disclosed in FIGURE 4 can be provided. Referring to FIGURE 4, a step down control transformer 27 is disclosed as connected across the primary supply lines $L_1$—$L_2$, this step down control transformer serving to step down the voltage, for example from 440 volts to 115 volts, across the secondary supply lines $X_1$—$X_2$. It is to be noted that fuses 28 and 29 are included in the control circuit to interrupt the circuit in the event of overload. When the fans 22 are "off" and the liquid solvent temperature is sufficiently hot, normally closed contacts 31Fc and 32TPc remain closed so that coil relay 33CR is energized. When 33CR is energized, normally open contacts 33CRc are closed and the circuit is set up for spraying operations. When the timer 34T, which is a twenty-four hour timer, reaches a predetermined set time, both normally open contacts 34Tc close. With the closure of one contact 34Tc, a pulsing timer coil 35T, is energized. This closes normally open contact 35Tc and causes the day stepper coil 36DS to be energized and move the day stepper S from "Home" position to the line which includes relay coil 37M. When relay coil 37M is energized, normally open contact 37Mc is closed and one row of filter tubes is set up for washing, for example on a Monday. In this connection, it is to be noted that the other normally open contact 34Tc dependent upon energization of the twenty-four hour timer 34T is also closed when such twenty-four hour timer reaches a predetermined set time. When this occurs, timer 38T is energized to close normally open holding contact 38Tc. As a result, solenoid valve 17M is energized to open position and the row of filter tubes under the branch pipe 16 in which the valve 17M is connected are washed. It is to be noted that during the washing of a row of tubes, a coil relay 39F is energized. The energization of 39F opens normally closed contact 39Fc which connects in the stop line of the fan starter coil circuit for fans 22. Thus, fans 22 are held in "off" position during a washing cycle operation.

At the end of a selected period, timer 38T "times out" and normally closed contacts 38TcL open to stop timer motor 38T and to de-energize solenoid 17M, bringing the washing cycle to an end. At the same time, coil 39F is de-energized and contact 39Fc is closed to permit the fans 22 to be restarted. It is to be noted that the holding contact 38Tc remains closed after "time out" until 33CR is opened by virtue of fan 22 being started; at that point, contact 38Tc opens permitting timer 38T to reset to starting position. The above cycle is repeated each twenty-four hours when timer 34T is energized to cause contacts 34Tc to close. In each twenty-four hour period stepper S advances one position to cause washing of successive rows of tubes in filter unit 2. When the stepper S reaches the last position, relay coil 41R is energized causing normally closed contact 41Rc to open and normally open contact 41R'c to close. The closure of contact 41R'c results in energization of reset coil 42R. Stepper S is returned to "Home" position, contact 43C is caused to open, and the entire wash operations for a weekly cycle can commence again.

In order to operate the above described system on manual cycle, it only is necessary to turn the "Man-Auto" selector switch to "Man" position. If the fans are off and the liquid temperature is correct, any row of the filter tube unit 2 can be washed by turning the respective selector switch to "on" position. Finally, it is to be noted that if power failure should occur during a wash cycle, the power failure selector switch 44 can be turned momentarily to restart position to reset the wash interval timer 38T. At the same time, the timer 34T can be adjusted for the lapsed time of power failure.

In spraying the tubes of a filter tube unit 2, it has been found advantageous to use a liquid solvent, such as water, which has been heated to a temperature in the range of approximately 140° F. to approximately 160° F. The hot liquids melt the oils present in the atmospheric dust so that the oils flow away carrying with them the smaller dust particles which have heretofore resisted the other modes of tube cleaning operations. For average dust conditions the liquid can be sprayed onto the tubes over a wash period cycle of 4 minutes, the electric timer circuit being set accordingly. The pressure of the liquid advantageously can be somewhere in the range of 35 to 55 pounds per square inch with the liquid wash rate set at six gallons per minute. It further has been found advantageous to add a small amount of soap or detergent to the spray liquid where large quantities of oil or insoluble resins are present in the atmospheric dust.

Referring to FIGURE 5 wherein there is disclosed a graph of an experimental test conducted for an eight (8) month period comparing the differences in filter tube resistance when a hot liquid solvent spray at 160° F. is used in a filter tube unit of the present invention and when a cold liquid solvent spray at 40° F. is used, it can be seen that hot liquid spray obtains a lower filter tube resistance upon washing and maintains such filter tube resistance lower over an extended period of time. Finally, it is to be noted that in an advantageous embodiment of the present invention, it is desirable to permit the sprayed filter tubes a drying time of approximately four to six hours, the length of time depending upon the relative humidity of the drying atmosphere.

The invention claimed is:

A dust collector comprising gas pervious, smooth surfaced, fast drying rot resistant, cloth fabric filter tube means free of dust retaining horns and scabs, "on-off" gas control means to control the flow of dust particle laden gases through said filter tube means, hot liquid supply means, liquid spray means connected to said hot liquid supply means to direct a sheet of hot liquid against said filter tube means to clean substantially the entire surface of said filter tube means of dust particles of varying sizes including those below 5 microns, wear sleeve means disposed within said filter tube means to extend over the area of initial liquid impingement, and "on-off" liquid control means cooperating with said hot liquid spray means and operably related to said "on-off" gas control means to control the flow of hot liquid from said spray means so that said filter tube means is sprayed when said gas control means is in "off" position.

References Cited in the file of this patent

UNITED STATES PATENTS

| | | |
|---|---|---|
| 176,571 | Williams | Apr. 25, 1876 |
| 1,118,045 | Playter | Nov. 24, 1914 |
| 1,397,557 | Smith | Nov. 22, 1921 |
| 2,201,520 | Callahan | May 21, 1940 |
| 2,633,929 | Farr | Apr. 7, 1953 |
| 2,725,117 | Borgerd | Nov. 29, 1955 |
| 2,765,047 | Hersey | Oct. 2, 1956 |
| 2,805,731 | Kron | Sept. 10, 1957 |

FOREIGN PATENTS

| | | |
|---|---|---|
| 791,510 | Great Britain | Mar. 5, 1958 |